(12) United States Patent
Sturt

(10) Patent No.: US 6,619,716 B1
(45) Date of Patent: Sep. 16, 2003

(54) INTEGRATED VEHICLE CONSOLE SYSTEM

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/213,687

(22) Filed: Aug. 7, 2002

Related U.S. Application Data

(60) Provisional application No. 60/368,264, filed on Mar. 28, 2002.

(51) Int. Cl.⁷ ................................................. B60N 3/12
(52) U.S. Cl. ...................................... 296/37.8; 224/311
(58) Field of Search ............................ 296/37.1, 37.8, 296/37.7; 224/311, 328

(56) References Cited

U.S. PATENT DOCUMENTS

| | | | |
|---|---|---|---|
| RE32,165 E | | 6/1986 | Gerring |
| 4,783,110 A | | 11/1988 | Beukema et al. |
| 4,893,867 A | | 1/1990 | Hilborn et al. |
| 5,357,408 A | | 10/1994 | Lecznar et al. |
| 5,441,339 A | | 8/1995 | Mathias et al. |
| 5,688,022 A | | 11/1997 | Adams et al. |
| 5,887,929 A | * | 3/1999 | Miller et al. ................ 296/37.8 |
| 5,931,525 A | | 8/1999 | Rickabus |
| 6,003,925 A | | 12/1999 | Litke et al. |
| 6,015,222 A | | 1/2000 | Schindler |
| 6,062,623 A | | 5/2000 | Lemmen |
| 6,120,091 A | | 9/2000 | Reich et al. |
| 6,126,221 A | * | 10/2000 | Kern .......................... 296/37.7 |
| 6,176,536 B1 | * | 1/2001 | Miller et al. ................ 296/37.7 |
| 6,234,570 B1 | | 5/2001 | Quinno et al. |
| 6,267,428 B1 | * | 7/2001 | Baldas et al. ............... 296/37.7 |
| 6,273,499 B1 | | 8/2001 | Guyon |
| 6,292,236 B1 | * | 9/2001 | Rosen ......................... 224/311 |
| 6,318,797 B1 | | 11/2001 | Bohm et al. |
| 6,338,517 B1 | | 1/2002 | Canni et al. |
| 6,412,848 B1 | * | 7/2002 | Ceccanese et al. ........ 296/37.7 |

* cited by examiner

Primary Examiner—D. Glenn Dayoan
Assistant Examiner—G Blankenship
(74) Attorney, Agent, or Firm—Bill C. Panagos

(57) ABSTRACT

An integrated overhead console system for a vehicle provides storage compartments and electronic devices such as map lights and infotainment systems. The vehicle headliner forms a console body portion of the console, and defines a space that has an opening. A retainer is located between the headliner and a vehicle roof panel. The storage compartments are covered by console doors, which attach directly to the retainer. The electronic devices also attach directly to the retainer, which eliminates the need for a large bezel. This reduces material costs and the weight of the vehicle.

18 Claims, 4 Drawing Sheets

INTEGRATED VEHICLE CONSOLE SYSTEM

CROSS-REFERENCE TO RELATED APPLICATIONS

This application claims the benefit of U.S. provisional application Ser. No. 60/368,264 filed Mar. 28, 2002.

BACKGROUND OF THE INVENTION

1. Field of the Invention

The present invention relates to an integrated overhead console system for a vehicle.

2. Background Art

The use of consoles to provide storage areas for use by vehicle occupants is well known. These consoles can be mounted in a variety of locations throughout the vehicle. With the increasing size of passenger vehicles, and in particular with the advent of the sport utility vehicle (SUV), the use of overhead consoles has become increasingly popular. Overhead consoles often traverse much of the length of the vehicle, and include much more than just storage compartments used to hold small accessories. For example, map lights are commonly placed in various locations along the length of the console. In addition, complete audiovisual infotainment systems are also housed within the overhead consoles of many vehicles today.

Typically, overhead consoles rely on a frame-like structure known as a bezel, to attach the various components to the console, and to keep them in place. For example, console doors that cover storage compartment openings often attach directly to the bezel. In addition, other components such as electronic devices may be held in place by the bezel. In some vehicles, components are attached to the console with fasteners, in which case a bezel may be used for aesthetic purposes—i.e., to cover the fasteners. The bezel itself often attaches to a retainer behind the vehicle headliner, especially when the bezel supports larger console components. As more and more features are added to overhead consoles, including specialized storage areas and a variety of electronic devices, the size and complexity of these overhead consoles necessarily increases. So too does the size of the bezel needed to secure the console components. This increases not only material costs, but tooling and installation costs, thereby contributing to an overall increase in the production cost of the vehicle.

Accordingly, it is desirable to provide an overhead vehicle console system capable of containing storage compartments and electronic devices, that eliminates the need for a bezel, thereby reducing material costs and weight.

SUMMARY OF THE INVENTION

One aspect of the present invention provides an improved overhead vehicle console system that integrates each of the console devices, thereby eliminating the need for a bezel, and reducing the amount of material needed to produce the console.

Another aspect of the invention provides an overhead vehicle console system that reduces the weight of the vehicle and reduces the overall production costs.

Accordingly, an overhead vehicle console system for use with a vehicle having a roof panel is provided. The vehicle console system comprises a headliner that is positioned proximate to the roof panel, and configured to form a console body portion. The console body portion defines a space that has an opening. A retainer is configured to be disposed between the headliner and the roof panel, and has at least one attachment structure. Also included in the vehicle console system is a console device that is attached to the at least one attachment structure, and that covers at least a portion of the opening.

Another aspect of the invention provides an overhead vehicle console system for use with a vehicle having a roof panel. The vehicle console system comprises a headliner that is positioned proximate to the roof panel, and configured to form a console body portion. The console body portion defines a space having an opening. A retainer is configured to be disposed between the headliner and the roof panel, and has a plurality of attachment structures. The vehicle console system also includes a plurality of console devices, each of which is attached to a corresponding attachment structure. At least one of the console devices covers at least a portion of the opening.

Still another aspect of the invention provides an overhead vehicle console system for use with a vehicle having a roof panel. The vehicle console system comprises a headliner that is positioned proximate to the roof panel, and configured to form a console body portion. The console body portion includes a top section and a plurality of first side sections. Each of the first side sections is adjacent to another first side section, and adjacent to the top section. The first side sections and the top section define a space having an opening. Also included in the console body portion is a plurality of second side sections, which are cooperable to form a portion of an outer structure of the console body portion. A retainer is configured to be disposed between the headliner and the roof panel, and has at least one attachment structure. The vehicle console system includes a console device attached to the at least one attachment structure, and covering at least a portion of the opening.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT(S)

Figure 1:
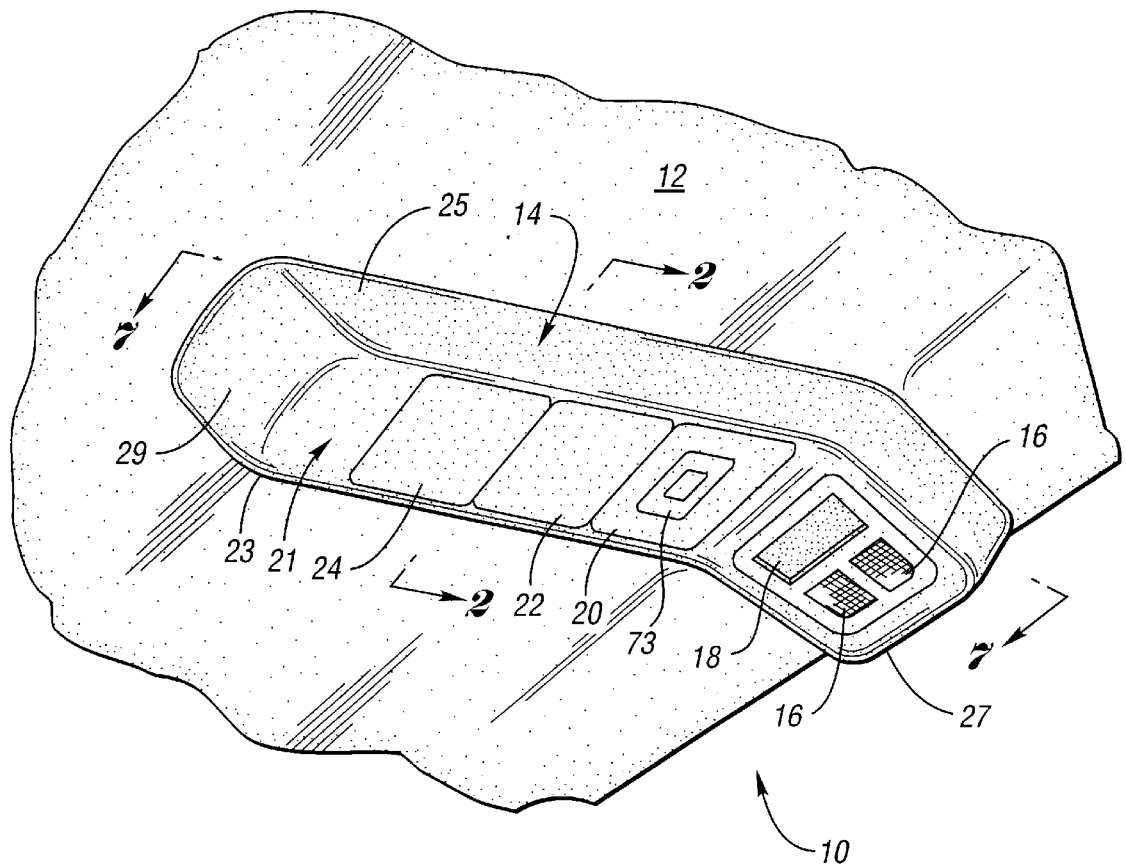
FIG. 1 is a fragmentary perspective view of an integrated overhead console system for a vehicle in accordance with the present invention.
Figure 2:
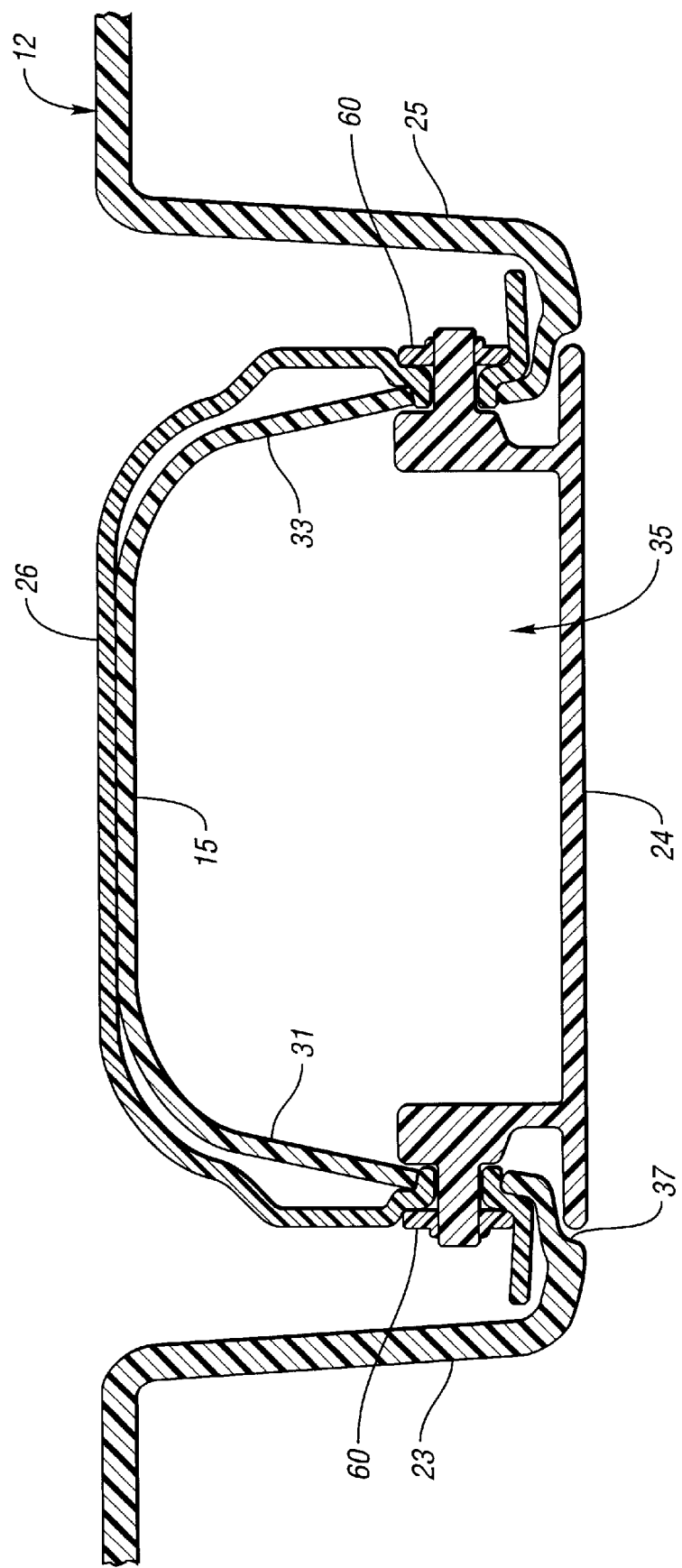
FIG. 2 is a fragmentary sectional view of the vehicle console system shown in FIG. 1 taken through line 2—2.
Figure 7:
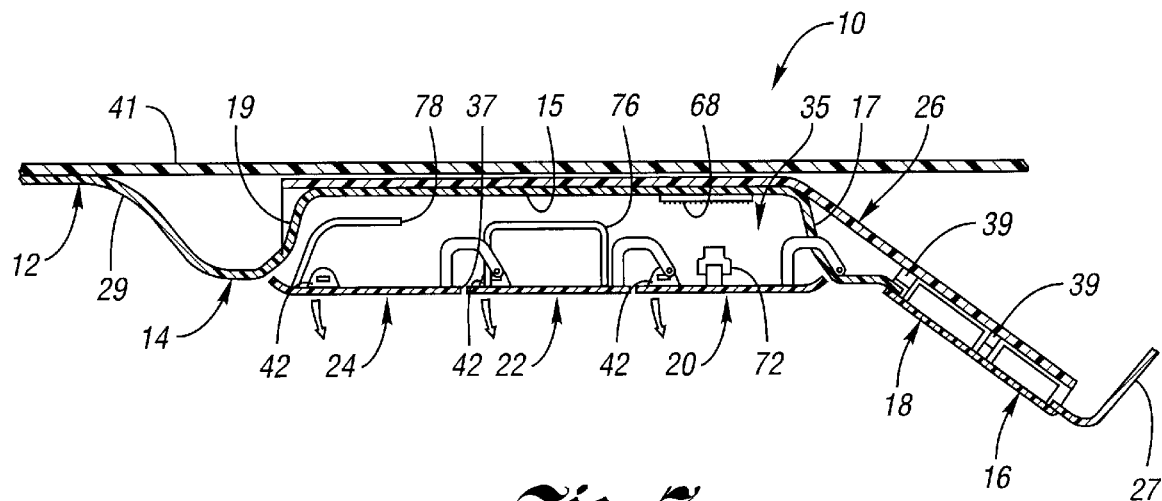
FIG. 7 is a fragmentary sectional view of the vehicle console system shown in FIG. 1 taken through line 7—7.

FIG. 1 shows an integrated overhead vehicle console system 10 in accordance with the present invention. A headliner 12 forms a console body portion 14 of the console system 10. Referring to FIG. 7 in conjunction with FIG. 1, it is seen that the console body portion 14 includes a top section 15 adjacent to first side sections 17, 19. The console body portion 14 also includes an outer structure 21, at least a portion of which is formed by second side sections 23, 25, 27, 29. Two additional first side sections 31, 33 are shown in FIG. 2. The two first side sections 31, 33 are oriented generally parallel with the second side sections 23, 25, and are adjacent to the first side sections 17, 19 and the top section 15. The top section 15 and the four first side sections define a space 35 having an opening 37. One method of producing the console body portion 14 is to use a deep drawing operation on the headliner 12. Well suited to the deep drawing operation are headliners made from thermoformable materials, though the use of headliners made from thermosets and other polymers is contemplated.

In the embodiment shown in FIGS. 1 and 7, the console system 10 also includes electronic devices such as map lights 16 and an information and entertainment (infotainment) system 18. The console system 10 also includes console doors 20, 22, 24. The map lights 16, the infotainment system 18, and the console doors 20, 22, 24 represent only a few of the console devices that can be included in the vehicle console system 10. Other console devices contemplated by the present invention include audio components, navigation systems, display systems, compasses, thermometers, and mirrors, or some combination thereof.

Figure 3:
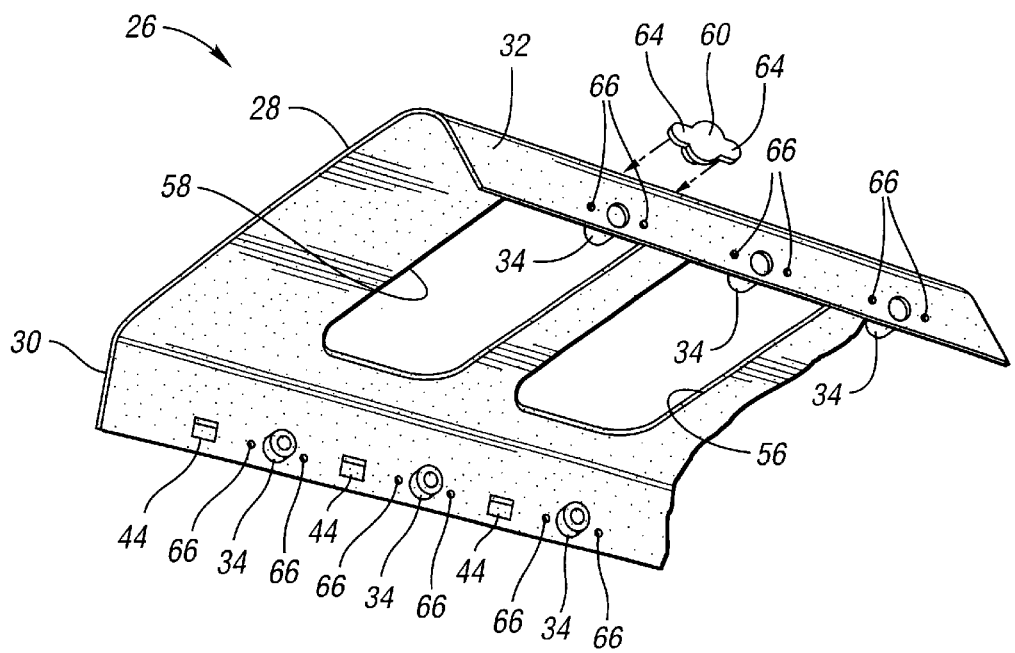
FIG. 3 is a partially exploded, fragmentary perspective view of a retainer used with the vehicle console system shown in FIG. 1.

A feature that is noticeably absent from the vehicle console system 10 shown in FIG. 1 is a molded frame or bezel. Typical overhead consoles rely on a bezel to hold the various console devices in place, or to cover fasteners which are used to anchor the devices. The present invention eliminates the need for a bezel by integrating all of the console devices such that they attach directly to a retainer 26, a portion of which is shown in FIG. 3. The retainer 26 has a top portion 28 and side portions 30, 32. The side portions 30, 32 contain attachment structures, which in this embodiment are bosses 34. The bosses 34 are raised portions of the retainer 26 that are configured to allow the console doors 20, 22, 24 to attach to the retainer 26. The bosses 34 are one of the attachment structures included in the retainer 26 for attaching the console devices to the retainer 26. Other attachment structures, such as the clips 39 shown in FIG. 7, are included so the other console devices—e.g., the map lights 16 and the infotainment system 18—can also be attached to the retainer. The retainer 26 may be made from any suitable material including metal, though a polymeric material is preferred. For example, the retainer 26 may comprise a polypropylene material, a polycarbonate acrylonitrile butadiene styrene (PC/ABS), or some other suitable polymeric material or materials. The retainer 26 may be held in place by the headliner 12, or may attach to a vehicle roof panel, such as the roof panel 41 shown in FIG. 7. The retainer may be attached to the vehicle roof panel with fasteners, which then helps to secure the entire console system. Such a configuration may be particularly useful with larger console systems, such as those used in SUV's.

Figure 4:
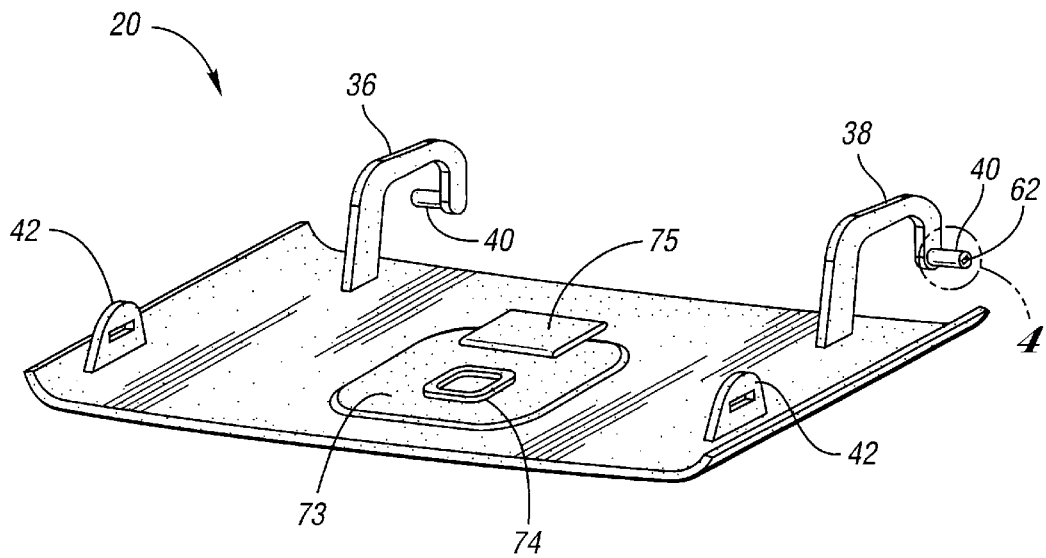
FIG. 4 is a perspective view of a console door configured for use with the vehicle console system shown in FIG. 1.

The console door 20, best seen in FIG. 4, includes hinges 36, 38, each of which contains a hinge pin 40. The other two console doors 22, 24 also contain similarly configured hinges. The hinge pins 40 pivotally attach to the bosses 34 on the retainer 26 shown in FIG. 3. The bosses 34 at least partially protrude through apertures in the headliner 12 to facilitate attachment to the hinge pins 40. In addition, the console door 20 includes clips 42 that mate with side catches 44 located on the side portions 30, 32 of the retainer 26. In FIG. 3, only three of the side catches 44 are visible, though the retainer 26 includes a total of six side catches 44. The clips 42 and side catches 44 shown in FIGS. 2 and 3, are just one configuration that can be used to help maintain the console doors 20, 22, 24 in the closed position. Alternatively, the retainer 26 may have any suitable configuration sufficient to help maintain the console doors 20, 22, 24 in the closed position.

Figure 6:
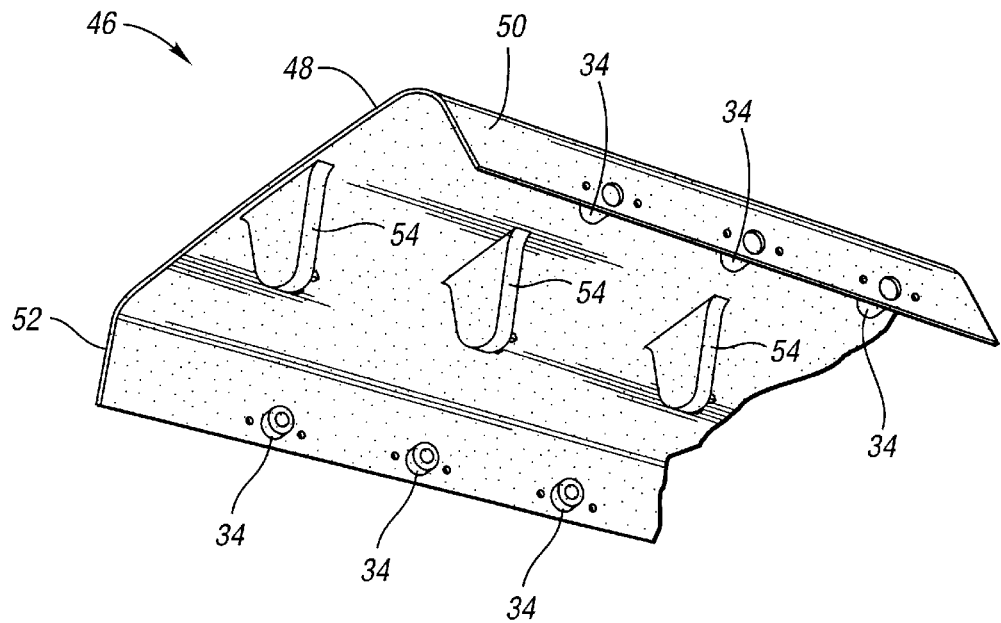
FIG. 6 is a fragmentary perspective view of an alternative embodiment of a retainer configured for use in the present invention.

FIG. 6, for example, shows an alternative embodiment 46 of a retainer according to the invention. A retainer 46 includes a top portion 48 and side portions 50, 52. Like the retainer 26, the retainer 46 also includes six bosses 34 configured to accept the hinge pins on each of the console door hinges. Unlike the retainer 26 however, the retainer 46 does not contain side catches such as the side catches 44 shown in FIG. 3. Rather, the retainer 46 includes center catches 54 that perform much the same function as the side catches 44, in that they help maintain the console doors in a closed position. Console doors (not shown) that are configured for use with a retainer such as the retainer 46, include center clips configured to mate with the center catches 54.

Returning to FIG. 3, it is seen that the top portion 28 of the retainer 26 is not solid. That is, it contains cut-out portions 56, 58 which are included to reduce the amount of material used in the production of the retainer 26. This not only reduces material costs, but also reduces weight. A motion control damper 60 is configured to attach to the hinges on the console doors 20, 22, 24 to help control the movement of the doors as they are opened and closed. Although only one motion control damper 60 is shown in FIG. 3, a total of six motion control dampers 60 will be used in this embodiment, one for each hinge. The motion control dampers 60 in this embodiment are hydraulic devices that facilitate a smooth opening and closing of the console doors. Of course, other types of dampers—e.g., pneumatic—may be used in place of hydraulic devices. In addition, as explained below in conjunction with FIG. 8, the motion control dampers can be geared to provide motion control for large console doors.

Figure 5:
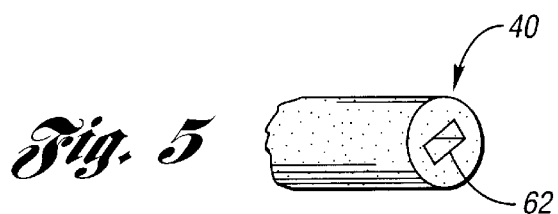
FIG. 5 is a detail of a hinge pin shown on the console door in FIG. 4.

Referring to FIGS. 3, 4, and 5, it is seen that each hinge pin 40 contains a socket 62. When the console door 20 is attached to the retainer 26, the hinge pins 40 extend into the bosses 34. A portion of each motion control damper 60 inserts into a corresponding socket 62. The motion control dampers 60 are also attached to the retainer 26 at flanges 64. The flanges 64 are fastened to apertures 66 using any one of a number of methods—e.g., they may be snapped in place, heat staked, riveted, welded, etc. The console door 20, also shown in FIG. 7, is configured to allow a vehicle occupant to actuate a garage door opener located behind the console door 20, without having to open it. A hook and loop fastener 68 is attached to the top section 15 of the console body portion 14 of the headliner 12. A garage door opener (not shown) may be attached to the hook and loop fastener 68 such that the button used to actuate the garage door opener is aligned with an actuator 72. The actuator 72 attaches to the console door 20 at a rectangular boss 74, and can be configured to work with a wide variety of garage door openers. When a vehicle occupant pushes a movable portion 73 in the console door 20, the actuator 72 moves upward to engage the button on the garage door opener. The movable portion 73 pivots about a hinge 75, thus allowing the garage door opener to be used when the console door 20 is in the closed position. This eliminates the need to repeatedly remove and replace the garage door opener each time it is used.

Each of the console doors 20, 22, 24 is shown in FIG. 7 in the closed position, but each can be pivotally opened as indicated by the three direction arrows. In the closed position, each of the three console doors 20, 22, 24 covers a portion of the opening 37. It is also seen in FIG. 7 that each of the console doors 20, 22, 24 has a slightly different configuration. For example, the console door 22 includes a storage bin 76 configured to hold small items such as tissue or other accessories that can be conveniently accessed by the vehicle occupants. The console door 24 includes another type of storage bin 78, configured to hold items such as sunglasses. As previously described, the console door 20 does not contain any type of storage bin, but rather, is configured to facilitate the use of a garage door opener.

Also shown in FIG. 7 are the electronic devices—i.e., the map lights 16 and the infotainment system 18. Other configurations of the present invention include smaller consoles having just storage areas covered by console doors, and consoles that merely contain electronic devices or other equipment such as audio components, navigation systems, display systems, compasses, thermometers, and mirrors, or some combination thereof. In these configurations, the space defined by the vehicle headliner may have a relatively small opening that is completely covered by a single door or electronic device.

Figure 8:
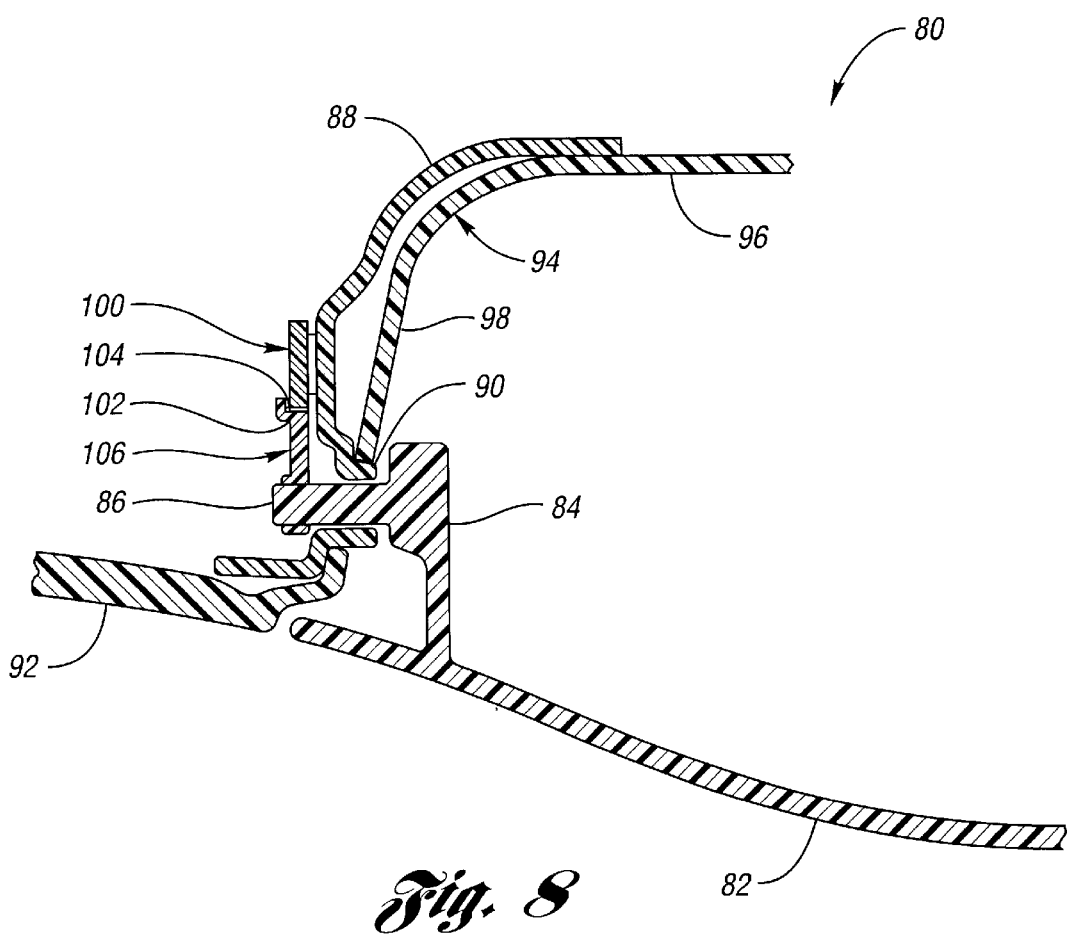
FIG. 8 is front fragmentary sectional view of an integrated overhead console system for a vehicle in accordance with an alternative embodiment of the present invention.

Returning to FIG. 2, it is seen that the second side sections 23, 25 have an approximate vertical orientation. This orientation distinctly marks the outer structure 21 of the console body portion 14 and helps to define it as separate from other portions of the headliner 12. In an alternative embodiment, the console body portion of the headliner has no sharply rising side sections, such as the second side sections 23, 25, but rather, blends into other portions of the headliner in a smooth transition. FIG. 8, for example, shows a sectional view of an integrated overhead vehicle console system 80 as viewed from the rear of the vehicle facing forward.

A console door 82 has a hinge 84 that includes a hinge pin 86. The hinge pin 86 is pivotally attached to a retainer 88 at an attachment structure, which in this embodiment is a boss 90 that protrudes through a headliner 92.

The headliner 92 is configured to form a console body portion 94 including a top section 96. The top section 96 is adjacent to four first side sections, only one of which, first side section 98, is visible in this view. Attached to the retainer 88 is a geared motion control damper 100 that helps to control the motion of the console door 82 as it opens and closes. The geared motion control damper 100 includes a first set of gear teeth 102 that intermeshes with a second set of gear teeth 104 on a spur gear 106. The spur gear 106 is attached to the hinge pin 86. By appropriately adjusting the gear ratio between the spur gear 106 and the motion control damper 100, the movement of even relatively large console doors, such as the console door 82, can be effectively controlled by a small damper, such as the damper 100.

As in the other embodiments of the invention, the vehicle console system 80 can be configured with a variety of console devices including console doors having storage compartments or those having a button to facilitate use of a garage door opener. In addition, electronic devices such as map lights, infotainment systems, audio components and the like are similarly installed in the vehicle console system 80. In each case, an outer portion of the console device is configured to blend smoothly from the center of the vehicle to the sides of the vehicle. One of the advantages of such a configuration is the aesthetically pleasing appearance of the smoothly shaped outer structure of the console system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overhead vehicle console system for use with a vehicle having a roof panel, the vehicle console system comprising:
   a headliner positionable proximate the roof panel and configured to form a console body portion, the console body portion defining a space having an opening;
   a retainer configured to be disposed between the headliner and the roof panel, and having at least one attachment structure; and
   a console device attached to the at least one attachment structure and covering at least a portion of the opening.

2. The vehicle console system of claim 1, further comprising a plurality of console devices, each console device being attached to the retainer at a corresponding attachment structure, and the console devices comprise an electronic device and a console door, the console door being configured to cover at least a portion of the opening.

3. The vehicle console system of claim 2, wherein the console door includes at least one hinge pivotally attached to the retainer at a corresponding attachment structure for selectively positioning the console door between an open position and a closed position.

4. The vehicle console system of claim 3, further comprising a damper attached to the at least one hinge for controlling the pivotal movement of the door.

5. The vehicle console system of claim 1, wherein a portion of the retainer is disposed at least partially through the headliner.

6. An overhead vehicle console system for use with a vehicle having a roof panel, the vehicle console system comprising:
   a headliner positionable proximate the roof panel and configured to form a console body portion, the console body portion defining a space having an opening;
   a retainer configured to be disposed between the headliner and the roof panel, and having a plurality of attachment structures; and
   a plurality of console devices, each console device being attached to a corresponding attachment structure, and at least one of the console devices covering at least a portion of the opening.

7. The vehicle console system of claim 6, wherein the console devices comprise an electronic device and a console door, the console door being configured to cover at least a portion of the opening.

8. The vehicle console system of claim 7, wherein the console door is selectively positionable between an open and a closed position, and wherein the console door includes a storage bin accessible to a vehicle occupant when the console door is in the open position.

9. The vehicle console system of claim 8, wherein the console door includes at least one hinge pivotally attached to the retainer at a corresponding attachment structure for facilitating movement of the console door between the open and the closed positions.

10. The vehicle console system of claim 9, further comprising a damper attached to the at least one hinge for controlling the pivotal movement of the door.

11. The vehicle console system of claim 6, wherein a portion of the retainer is disposed at least partially through the headliner.

12. An overhead vehicle console system for use with a vehicle having a roof panel, the vehicle console system comprising:
- a headliner positionable proximate to the roof panel and configured to form a console body portion, the console body portion including a top section, a plurality of first side sections, and a plurality of second side sections, each of the first side sections being adjacent to another first side section and adjacent to the top section, such that the first side sections and the top section define a space having an opening, and the second side sections being cooperable to form a portion of an outer structure of the console body portion;
- a retainer configured to be disposed between the headliner and the roof panel, and having at least one attachment structure; and
- a console device attached to the at least one attachment structure, and covering at least a portion of the opening.

13. The vehicle console system of claim 12, wherein the console device is a console door, configured to cover at least a portion of the opening.

14. The vehicle console system of claim 13, further comprising an electronic device attached to the retainer at a corresponding attachment structure.

15. The vehicle console system of claim 13, wherein the console door includes at least one hinge pivotally attached to the retainer at the at least one attachment structure to facilitate movement of the console door between an open and a closed position.

16. The vehicle console system of claim 15, further comprising a damper attached to the at least one hinge for controlling the pivotal movement of the door.

17. The vehicle console system of claim 15, wherein the console door includes a storage bin accessible to a vehicle occupant when the console door is in the open position.

18. The vehicle console system of claim 12, wherein a portion of the retainer traverses at least one of the first side sections of the console body portion.

* * * * *